United States Patent
Omura

(10) Patent No.: US 9,519,855 B2
(45) Date of Patent: Dec. 13, 2016

(54) NON-CONTACT IC LABEL AND NAMEPLATE

(71) Applicant: TOPPAN PRINTING CO., LTD., Taito-ku (JP)

(72) Inventor: Kunio Omura, Taito-ku (JP)

(73) Assignee: TOPPAN PRINTING CO., LTD., Taito-ku (JP)

(*) Notice: Subject to any disclaimer, the term of this patent is extended or adjusted under 35 U.S.C. 154(b) by 0 days.

(21) Appl. No.: 14/567,351

(22) Filed: Dec. 11, 2014

(65) Prior Publication Data

US 2015/0090801 A1  Apr. 2, 2015

Related U.S. Application Data

(63) Continuation of application No. PCT/JP2013/066348, filed on Jun. 13, 2013.

(30) Foreign Application Priority Data

Jun. 13, 2012 (JP) ................................ 2012-134296

(51) Int. Cl.
*G06K 19/06* (2006.01)
*G06K 19/077* (2006.01)
(Continued)

(52) U.S. Cl.
CPC ... *G06K 19/07773* (2013.01); *G06K 19/07771* (2013.01); *G06K 19/07786* (2013.01); *H01Q 1/2225* (2013.01); *H01Q 9/26* (2013.01)

(58) Field of Classification Search
CPC ............ G06K 19/07749; G06K 19/077; G07F 7/1008; B42D 15/10
(Continued)

(56) References Cited

U.S. PATENT DOCUMENTS

2008/0122704 A1  5/2008  King
2010/0090015 A1* 4/2010  Sakama ............... H01Q 1/2225
                                                              235/492

(Continued)

FOREIGN PATENT DOCUMENTS

EP    2 608 117 A1    6/2013
JP    2000-076400 A   3/2000

(Continued)

OTHER PUBLICATIONS

Extended European Search Report issued Oct. 26, 2015 in Patent Application No. 13804523.2.
(Continued)

*Primary Examiner* — Karl D Frech
(74) *Attorney, Agent, or Firm* — Oblon, McClelland, Maier & Neustadt, L.L.P.

(57) ABSTRACT

A non-contact IC label includes a magnetic sheet, a gap retention member including a dielectric material, and a communication section provided between the magnetic sheet and the gap retention member. The communication section includes an IC chip and a first antenna section and a second antenna section which are connected to the IC chip. The magnetic sheet has a first magnetic face facing the gap retention member, and the IC chip, the first antenna section and the second antenna section are provided on the first magnetic face of the magnetic sheet.

18 Claims, 4 Drawing Sheets

(51) Int. Cl.
*H01Q 1/22* (2006.01)
*H01Q 9/26* (2006.01)

(58) Field of Classification Search
USPC .......................................... 235/492, 487, 488
See application file for complete search history.

(56) References Cited

U.S. PATENT DOCUMENTS

| 2010/0127876 | A1 | 5/2010 | King | |
|---|---|---|---|---|
| 2011/0210176 | A1 | 9/2011 | King | |
| 2011/0241837 | A1* | 10/2011 | Suzuki | G06K 7/0008 |
| | | | | 340/10.1 |
| 2013/0135172 | A1* | 5/2013 | Ito | G06K 19/07794 |
| | | | | 343/867 |
| 2013/0140371 | A1* | 6/2013 | Omura | G06K 19/07786 |
| | | | | 235/492 |

FOREIGN PATENT DOCUMENTS

| JP | 2005-309811 A | 11/2005 |
|---|---|---|
| JP | 2006-222873 A | 8/2006 |
| JP | 2006-285709 A | 10/2006 |
| TW | 201214295 A1 | 4/2012 |
| WO | WO 2012/023511 A1 | 2/2012 |

OTHER PUBLICATIONS

International Search Report issued Jul. 9, 2013, in PCT/JP2013/066348 (with English translation).
Chinese Office Action issued Sep. 5, 2016 in CN 201380024988.9, filed Jun. 13, 2013 (with English translation).

\* cited by examiner

NON-CONTACT IC LABEL AND NAMEPLATE

CROSS-REFERENCE TO RELATED APPLICATIONS

The present application is a continuation of International Application No. PCT/JP2013/066348, filed Jun. 13, 2013, which is based upon and claims the benefits of priority to Japanese Application No. 2012-134296, filed Jun. 13, 2012. The entire contents of these applications are incorporated herein by reference.

BACKGROUND OF THE INVENTION

Technical Field

The present invention relates to a non-contact IC label that is used in a UHF band and a SHF band, and a nameplate including the non-contact IC label.

Background Art

In the related art, wireless communication is performed between an RFID tag (non-contact integrated circuit (IC) label) and a reader or the like. However, communication performance of the RFID tag is lowered when the RFID tag is attached on an adherent made of metal. Accordingly, in order to solve the problem, the RFID tags of various configurations are examined.

SUMMARY OF INVENTION

According to one aspect of the present invention, a non-contact IC label includes a magnetic sheet, a gap retention member including a dielectric material, and a communication section provided between the magnetic sheet and the gap retention member. The communication section includes an IC chip and a first antenna section and a second antenna section which are connected to the IC chip. The magnetic sheet has a first magnetic face facing the gap retention member, and the IC chip, the first antenna section and the second antenna section are provided on the first magnetic face of the magnetic sheet.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
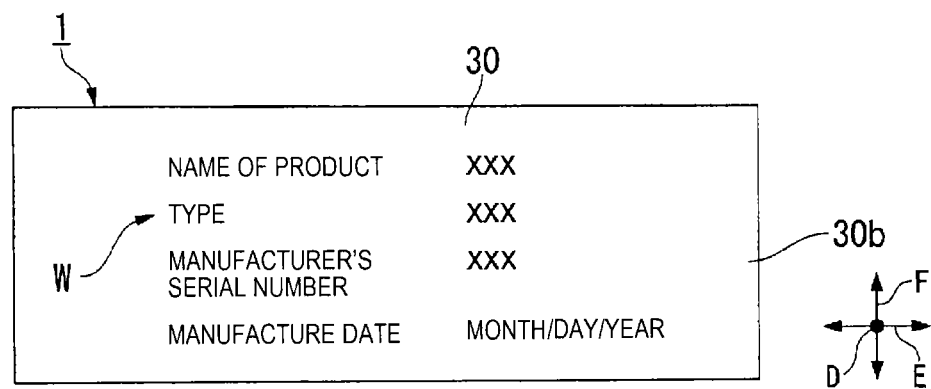
FIG. 1 is a plan view of a nameplate according to a first embodiment of the invention.

The embodiments will now be described with reference to the accompanying drawings, wherein like reference numerals designate corresponding or identical elements throughout the various drawings.

First Embodiment

Hereinafter, a nameplate according to a first embodiment of the invention, will be described with reference to FIG. 7 from FIG. 1.

The nameplate according to the first embodiment of the invention, is stuck onto an outer face of an adherent made of metal which is not shown in the drawing, and in the state of being stuck, performs communication with an external data reading device in non-contact.

Figure 3:
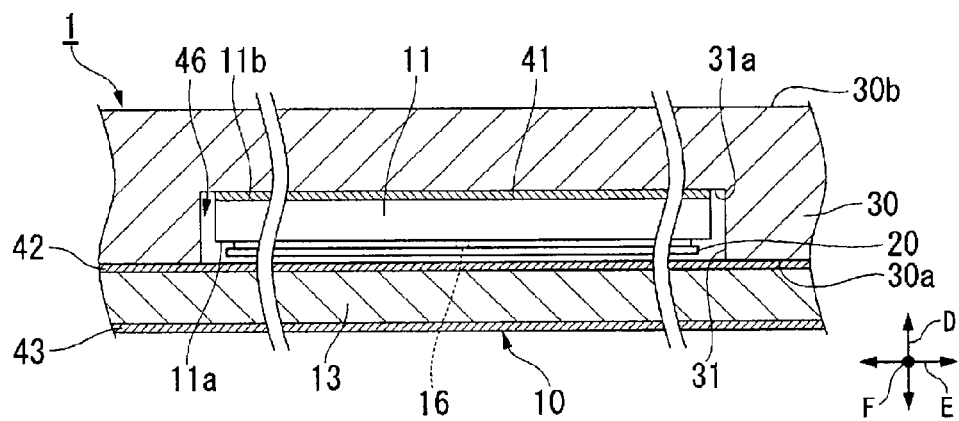
FIG. 3 is a cross-sectional view of a cutting-plane line A1-A1 in FIG. 2.

As shown in FIG. 3 from FIG. 1, a nameplate 1 according to the present embodiment, includes a non-contact IC label 10 that enables to communicate in non-contact, and a plate-shaped main body section 30 in which a hole section 31 accommodating a portion of the non-contact IC label 10 is formed on a first face 30a.

Furthermore, in the following drawings of all, for ease in seeing the drawings, a thickness or a ratio of dimensions of each component is appropriately changed.

Figure 4:
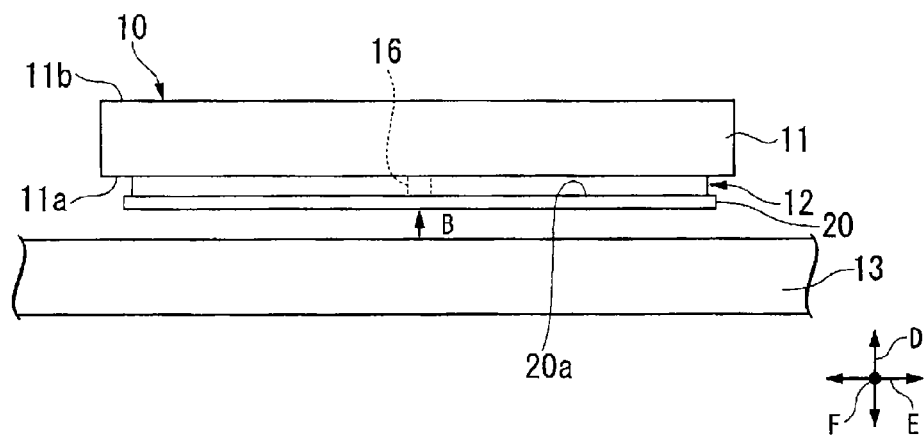
FIG. 4 is a side view of a non-contact IC label configuring the nameplate according to the first embodiment of the invention.
Figure 5:
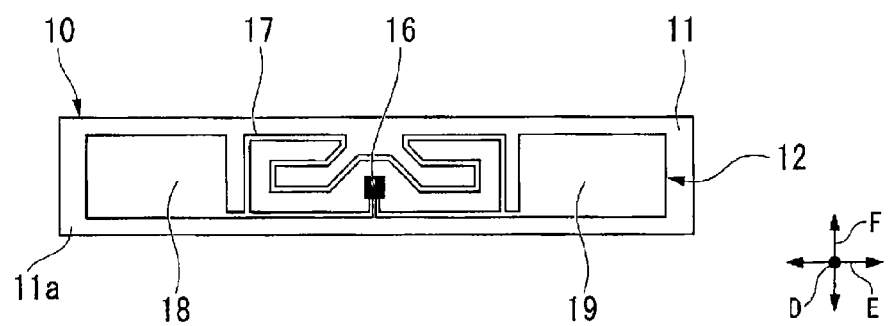
FIG. 5 is a B direction arrow view in FIG. 4.

In FIG. 4 and FIG. 5, a side view of the non-contact IC label 10, and a B direction arrow view in FIG. 4 are shown, respectively. In addition, in FIG. 5, a base material 20 to be described later is not shown.

As shown in FIG. 4 and FIG. 5, the non-contact IC label 10, has a magnetic sheet 11, a communication section 12 that is arranged on one face (a first magnetic face) 11a of the magnetic sheet 11, and a gap retention plate (gap retention section) 13 that is placed on an opposite side to the magnetic sheet 11 with respect to the communication section 12. That is, the communication section 12 is placed so as to be interposed between the magnetic sheet 11 and the gap retention plate 13.

The magnetic sheet 11, is formed of a composite material of magnetic particles, or magnetic flakes, and plastic or rubber, and it is possible to use a known flexible material as a label use.

As shown in FIG. 5, in planar view in a thickness direction (second thickness direction) D of the magnetic sheet 11, the magnetic sheet 11 is formed into a rectangular shape which is long in a longitudinal direction E.

The communication section 12 is placed at a center of the magnetic sheet 11 in planar view.

The communication section 12 has an IC chip 16, an impedance matching circuit section 17 that is connected to the IC chip 16, a first antenna element (first antenna section) 18 and a second antenna element (second antenna section) 19 that are connected to the impedance matching circuit section 17, and are placed so as to interpose the impedance matching circuit section 17 in the longitudinal direction E (so as to place the impedance matching circuit section 17 therebetween in the longitudinal direction E).

As the IC chip 16, the IC chip of a known configuration is used, and predetermined information is stored inside of the IC chip 16. Therefore, by supplying energy of a radio wave by a radio wave system from an electric contact that is arranged on the IC chip 16 and is not shown in the drawing, the stored information can be transmitted as a radio wave to outside from the electric contact.

In the embodiment, the impedance matching circuit section 17, the antenna elements 18 and 19, are integrally formed, by printing with a silver paste ink on a principal face 20*a* of the base material 20 which is formed into a film shape such as PET.

The impedance matching circuit section 17 is formed by wiring which is meandered in a predetermined shape.

The antenna elements 18 and 19 are formed into the rectangular shape so as to have a longer side in the longitudinal direction E in planar view. The first antenna element 18 and the second antenna element 19, are connected to the IC chip 16, through the impedance matching circuit section 17. The impedance matching circuit section 17 is electrically connected to the electric contact which is not shown in the drawing of the IC chip 16. The impedance matching circuit section 17 is configured so as to generate a predetermined impedance equal to each other, and a resistance value, between the IC chip 16 and the first antenna element 18, and between the IC chip 16 and the second antenna element 19.

The communication section 12 which is configured as described above, has two antenna elements 18 and 19 on one face 11*a* of the magnetic sheet 11, and is a so-called dipole antenna.

The gap retention plate 13 is formed into the rectangular shape so as to have the longer side in the longitudinal direction E in planar view, by a dielectric body such as resin. In Example, in planar view, the gap retention plate 13 is formed so as to cover a range where the magnetic sheet 11 is placed. That is, in planar view, the gap retention plate 13 is placed so that an outer edge thereof surrounds the outer edge of the magnetic sheet 11.

The magnetic sheet 11 and the gap retention plate 13, are connected through the main body section 30 as shown in FIG. 3, and are not directly connected. However, for example, the non-contact IC label 10 may include a connection member that is directly connected to the base material 20 and the gap retention plate 13.

In the embodiment, the material of the whole main body section 30 is a metallic member. The main body section 30 is formed into the same rectangular shape as the gap retention plate 13 in planar view. The main body section 30 is formed of aluminum in the embodiment.

Furthermore, the material forming the metallic member is not necessary to be the metal of weight ratio of 100%, and may be formed of the metal in which a portion exceeding weight ratio of 50% is metal.

The hole section 31 is arranged in an edge section of a center section on a longer side 30*c* of the main body section 30 (end section in a width direction F of the main body section 30 at the center section in the longitudinal direction E of the main body section 30). As shown in FIG. 3, a distance up to a bottom face 31*a* of the hole section 31 from the first face 30*a* of the main body section 30 in the thickness direction D is set to, for example, approximately 450 μm.

The dimensions of the main body section 30 are, for example, 100 mm (length (the length in the longitudinal direction E))×50 mm (width (the length in the width direction F which is individually orthogonal to the thickness direction ID and the longitudinal direction E))×1 mm (thickness (the length in the thickness direction D)), and the length and the width are the sizes which are equivalent to the nameplate made of metal in the related art.

As shown in FIG. 1, a second face 30*b* of the main body section 30 is a display face. On the second face 30*b*, a display W showing a product name, a type, and the like is formed.

The display W is formed on the second face 30*b* of the main body section 30 by printing or laser engraving or the like. Furthermore, if a modification amount of the main body section 30 is small, the display W may be formed with a carved seal by stamping.

Figure 2:
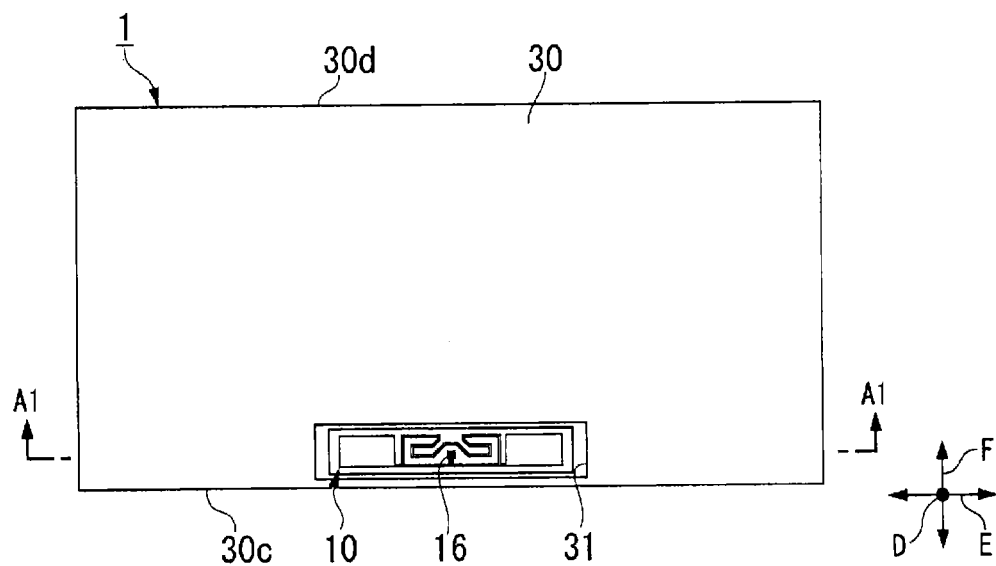
FIG. 2 is a transparent view of the nameplate according to the first embodiment of the invention.

The hole section 31 is formed into the size which enables to accommodate the elements other than the gap retention plate 13 configuring the non-contact IC label 10, that is, the magnetic sheet 11, the communication section 12, and the base material 20, as shown in FIG. 2 and FIG. 3. The magnetic sheet 11 is attached to the main body section 30 by sticking the other face (a second magnetic face) 11*b* of an adhesion layer for sheet 41 onto the center section of the bottom face 31*a* of the hole section 31 due to the adhesion layer for sheet (adhesion layer) 41. Hereby, in planar view, the non-contact IC label 10 is attached to the edge section of the center section on the longer side 30*c* of the main body section 30.

By sticking one face of the gap retention plate 13 onto the first face 30*a* of the main body section 30 due to an adhesion layer for retention plate 42, the gap retention plate 13 is attached to the main body section 30 so as to cover the hole section 31. The gap retention plate 13 seals the hole section 31 in watertight.

When the gap retention plate 13 is attached to the main body section 30, an accommodation section 46 is formed from the hole section 31 of the main body section 30 and the gap retention plate 13.

Additionally, when the nameplate 1 which is configured as described above, is attached to the adherent made of metal, an adhesion layer for nameplate 43 that is arranged on the other face of the gap retention plate 13, is used. By sticking the adhesion layer for nameplate 43 onto the adherent, the nameplate 1 is attached to the adherent.

As the adhesion layers 41, 42, and 43, it can be used by appropriately selecting a known adhesive agent such as synthetic rubber or acrylic. It is preferable that the thickness of the adhesion layer for sheet 41 is set to between 10 μm and 30 μm.

Next, a test for checking communication performance of the present nameplate 1, is performed. Contents thereof are shown hereinafter.

(Test)

Figure 6:
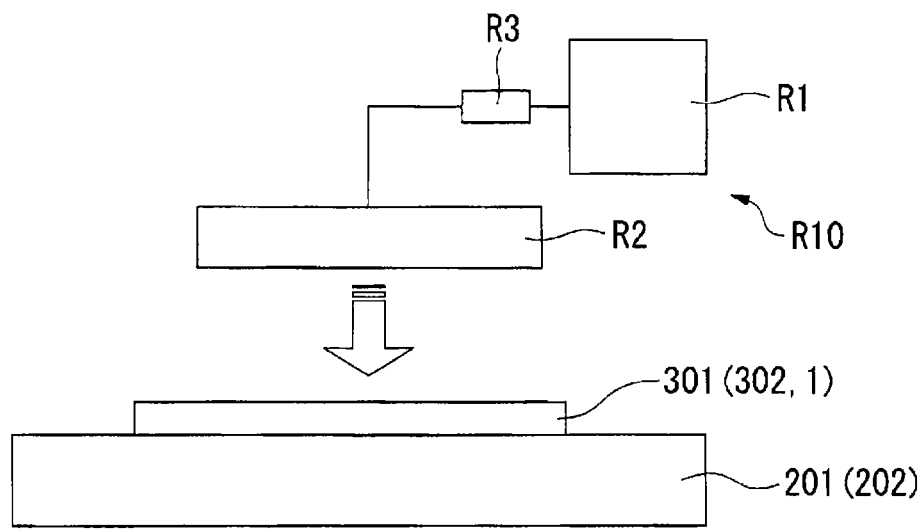
FIG. 6 is a side view describing an order of a test using the nameplate according to the first embodiment of the invention.

The test is performed in the configuration which is shown in FIG. 6.

In the main body section 30, an aluminum plate of 100 mm (length)×50 mm (width)×1 mm (thickness), is used.

In the magnetic sheet 11, NRC010 (thickness 100 μm) and NRC025 (thickness 250 μm) of 38 mm×7 mm which are manufactured by Daido Steel Co., Ltd., are used.

In the IC chip 16, UCODE G2iL manufactured by NXP Semiconductors is used.

The impedance matching circuit section 17, and the antenna elements 18 and 19, are formed by pattern printing (thickness 8 μm) with the silver paste ink on the base material 20 which is formed into the PET film (thickness 50 μm). Additionally, the dimensions of the antenna elements 18 and 19 adopt 9 mm×5 mm. Among the members configuring the communication section 12, the members which are manufactured by our company other than the IC chip 16, are used.

In a reader-writer R1, RF-RW002 (maximum output 1 W 30 dBm) which is a reader-writer for 950 MHz band RFID manufactured by Mitsubishi Electric Corporation, is used.

In a reading antenna R2, RF-ATCP001 (circularly polarized wave maximum gain 6 dBi) which is an antenna for 950 MHz band RFID manufactured by Mitsubishi Electric Corporation, is used.

In a fixed attenuator R3, AT-107 (attenuation amount 7 dB) manufactured by Hirose Electric Co., Ltd., is used.

Furthermore, the reader-writer R1, the reading antenna R2, and the fixed attenuator R3, configure a data reading device R10.

In polystyrene foam 201, polystyrene foam in the size of 420 mm (length)×160 mm (width)×50 mm (thickness), is used.

In a metallic plate (adherent made of metal) 202, a plate of 250 mm (length)×250 mm (width)×0.5 mm (thickness) which is manufactured by stainless steel, is used.

(Test Method)

Before a manufacture test of the nameplate 1 according to Example of the invention, the manufacture test of a nameplate where the gap retention plate 13 is not attached to the main body section 30, is performed as Comparative Example.

In the test, the dimensions of the antenna elements 18 and 19 are 9 mm×5 mm, and the antenna element whose element length is extremely short is used.

As shown in FIG. 6, a nameplate 301 is placed so that the main body section 30 is positioned at the center section of an upper face of the polystyrene foam 201, and a measurement of a communication range (a maximum value of the distance in which the data reading device R10 can read the information in non-contact) is performed, by the reading antenna R2 which is connected to the data reading device R10. In addition, a reading direction at the time of the measurement, makes the face where the non-contact IC label 10 is placed (first face 30a of the main body section 30) as a surface, and an opposite face to the face (second face 30b of the main body section 30) as a rear face, and the reading from both faces is performed by turning the main body section 30 upside down.

In the test, the reading is performed by pressurizing and adhering both of the main body section 30 and the non-contact IC label 10 with a band which is not shown in the drawing. Furthermore, it is found out that the polystyrene foam 201 which is used in the test, does not almost have an influence on a measurement result of the communication range.

The reader-writer R1 and the reading antenna R2 which are used in the test, are a UHF band high output reader-writer and antenna that enable to read the main body section 30 to which the non-contact IC label 10 is attached, in a certain communication range. The maximum output of the reader-writer R1 is 1 W (30 dBm), but for convenience of test circumstances, the fixed attenuator R3 of −7 dB is connected onto a coaxial cable linking the reader-writer R1 and the reading antenna R2, and the output of the reader-writer R1 is attenuated to 0.2 W (23 dBm), and thereby the test is performed.

The reading antenna R2 is rotated toward the main body section 30, and the reading is performed at two angles of 0 degree and 90 degrees with respect to the main body section 30, and the values of the side where the communication range is long, are adopted as a test result. The magnetic sheet 11 which is used in the test, is used as a magnetic sheet of 350 μm thickness by superposing the magnetic sheets of 100 μm thickness and 250 μm thickness.

(1-1 Test)

At the center section of the first face 30a of the main body section 30, the non-contact IC label 10 is placed so that the longitudinal direction of the non-contact IC label 10 is parallel to the longitudinal direction of the main body section 30, and thereby the nameplate 301 is configured as Comparative Example. In the state, the measurement of the communication range of the nameplate 301 is performed.

(1-2 Result)

The measurement result of the communication range is shown hereinafter.

Surface: 175 mm

Rear face: unreadable

From the measurement result, the communication range in the reading from the surface is favorable, but it is not possible to read from the rear face.

(2-1 Test)

On the first face 30a of the main body section 30, in a position (edge section of the center section on the longer side 30c) which is shown in FIG. 2 in planar view, the non-contact IC label 10 is placed so that the longitudinal direction of the non-contact IC label 10 is parallel to the longitudinal direction of the main body section 30, and thereby a nameplate 302 is configured as Comparative Example. To the nameplate 302, the gap retention plate 13 is not attached.

In the state, the measurement of the communication range of the nameplate 302 is performed.

(2-2 Result)

The measurement result of the communication range is shown hereinafter.

Surface: 335 mm

Rear face: 215 mm

From the measurement result, the communication range in the reading from the surface is improved, in comparison to the communication range of the nameplate 301 which is shown in the test of 1-1. Additionally, the reading from the rear face of the nameplate 302 can be also checked.

The present test is considered that if the main body section 30 resonates with a frequency of a communication electromagnetic wave of the data reading device R10, and the main body section 30 functions as a radiation antenna of the non-contact IC label 10, it is possible to read from a rear face direction, and the test of the contents described above is performed.

From the test result described above, by placing the non-contact IC label 10 in the position of the test 2, that is, in the edge section of the center section on the longer side 30c of the main body section 30, it is possible to read from the rear face. Accordingly, it is found out that the main body section 30 resonates with the frequency of the communication electromagnetic wave of the data reading device R10, and the main body section 30 functions as a radiation antenna of the non-contact IC label 10.

Next, the test is performed using the nameplate 1 of the present Example.

Here, in the gap retention plate 13 which is attached to the first face 30a of the main body section 30, in addition to a sealing function of the accommodation section 46 described before, another function relating to the communication range performance with an external reading device, will be also described.

(3-1 Test)

Using the nameplate 1 of the present Example, the test changing the thickness of the gap retention plate 13, is performed in the same method as the tests 1 and 2, using the metallic plate 202 which is made of stainless steel instead of the polystyrene foam 201 of the tests 1 and 2 described before.

Furthermore, the main body section 30 of the nameplate 1 and the non-contact IC label 10, are in the form as shown in FIG. 2 and FIG. 3, and the non-contact IC label 10 is stuck onto the bottom face 31a of the hole section 31 which is arranged in the main body section 30. Therefore, the test is performed by attaching the gap retention plate 13 of the nameplate 1 to the metallic plate 202.

The nameplate 1 according to the embodiment of the invention, is stuck onto the outer face of the adherent made of metal, and in the state of being stuck, aims to perform the communication with the external data reading device in non-contact. Accordingly, in the present test, the test is performed using the metallic plate 202 which is made of stainless steel as an adherent made of metal. In addition, the dimensions of the used metallic plate 202, are in the size of 250 mm (length)×250 mm (width)×0.5 mm (thickness), and the dimensions are the size that does not resonate with the frequency of the communication electromagnetic wave of the reader-writer R1.

In the present test, the gap retention plate 13 is formed into the sheet made of PET (Poly-Ethylene-Terephthalate) which is the dielectric body. The size of the gap retention plate 13, is the length and the width which are the same as the main body section 30. The gap retention plate 13 is set to the thickness up to 3000 µm from 250 µm, by overlapping the PET sheet whose thickness is 250 µm in plural sheets from one sheet, and the measurement of the communication range is performed with respect to each thickness. Additionally, since an object in the invention is to provide the nameplate whose thickness is thin, an upper limit of the thickness of the gap retention plate 13 in the present test, is set to be 3000 µm (3 mm).

The gap retention plate 13 is adhered onto the first face 30a of the main body section 30, and the second face 30b is opposed to the reading antenna R2, and thereby the measurement is performed. Moreover, in the present test, the adhesion layer for retention plate 42 and the adhesion layer for nameplate 43 are not arranged in the nameplate 1. This is because the adhesion layers 42 and 43 do not almost have the influence on the measurement result of the communication range of the nameplate 1.

(3-2 Result)

Figure 7:
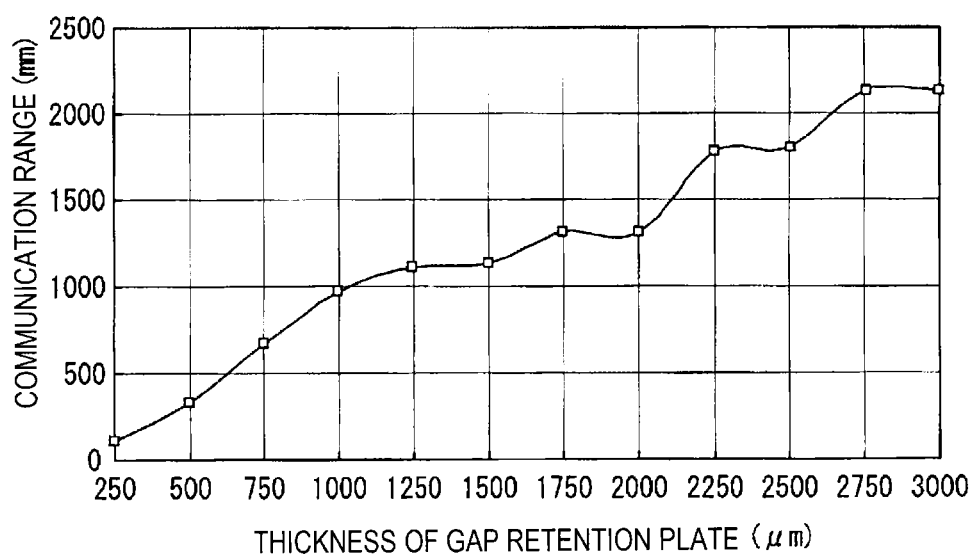
FIG. 7 is a diagram of a test result which measures a communication range using the nameplate according to the first embodiment of the invention.

The measurement result (graph) of the communication range by the test, is shown in FIG. 7.

As shown in FIG. 7, by thickening the thickness of the gap retention plate 13, it is found out that the communication range is enlarged nearly in a linear manner. In the thickness of 500 µm, the value close to the communication range which is placed on the polystyrene foam 201 and is measured, is made, and the communication range is further enlarged in a domain where the thickness exceeds 500 µm. The communication range thereof reaches 2000 mm or more in the thickness of 3000 µm.

In this way, the thickness of the gap retention plate 13 is greater than 500 µm, and is 3000 µm or less, and thereby it is possible to enlarge the communication range with the data reading device R10, while configuring the nameplate 1 thinly. Furthermore, it is more preferable that the thickness of the gap retention plate 13, is from 1500 µm to 2750 µm.

From the result of the test of 2-2 described before, it is found out that the main body section 30 resonates with the frequency of the communication electromagnetic wave of the reading device, and functions as a radiation antenna. With respect to the main body section 30 which functions as a radiation antenna, when it is considered that the metallic plate 202 acts as a conductor ground plate of a microstrip, the configuration of the present test, can be seen as a configuration which is similar to a patch antenna having the conductor ground plate.

That is, the main body section 30 functions as a radiation element of the patch antenna, and one metallic plate 202 functions as a conductor ground plate of the same antenna, and thereby it is considered that the same effect as the patch antenna is generated, and radiation directivity thereof is concentrated on a data reading device R10 side (electromagnetic wave arrival direction) and the communication range is enlarged. The patch antenna has directivity properties of approximately 9 dB at most theoretically by increasing an area of the conductor ground plate, and an enlargement amount of the communication range of the test result, can be inferred from the maximum value of the directivity properties of the patch antenna.

As described above, according to the non-contact IC label 10 and the nameplate 1 according to the present embodiment, by placing the gap retention plate 13 on the opposite side to the side where the magnetic sheet 11 is arranged in the communication section 12, even when the non-contact IC label 10 is used by attaching the gap retention plate 13 to the metallic plate 202, the communication with the data reading device R10 can be performed.

Since each of the magnetic sheet 11, the communication section 12, the gap retention plates 13, and the base material 20 can be thinly formed, it is possible to configure the non-contact IC label 10 and the nameplate 1 in a thin type.

The impedance matching circuit section 17, and the antenna elements 18 and 19, are integrally formed on the principal face 20a of the base material 20. In this way, by arranging a plurality of components on the base material 20 in advance, it is possible to enhance manufacture efficiency of the non-contact IC label 10.

By setting that the thickness of the gap retention plate 13 is greater than 500 µm, and is 3000 µm or less, it is possible to further enlarge the communication range with the data reading device R10, while configuring the non-contact IC label 10 and the nameplate 1 thinly.

By configuring the nameplate 1 using the non-contact IC label 10, it is possible to arrange the display W on the second face 30b of the main body section 30, while communicating with the data reading device R10.

In planar view, by attaching the non-contact IC label 10 to the edge section of the center section on the longer side 30c of the main body section 30, it is possible to further enlarge the communication range with the data reading device R10.

The magnetic sheet 11, the communication section 12, and the base material 20 are accommodated inside of the hole section 31 of the main body section 30, and the gap retention plate 13 is attached to the main body section 30 so as to cover the hole section 31. Therefore, the sealing function protecting the magnetic sheet 11, the communication section 12, and the base material 20 which are accommodated in the accommodation section 46, from liquid, dust, moisture, or gas, is held at the same time.

According to the nameplate 1 of the present embodiment, by setting the thickness (gap between the main body section 30 and the metallic plate 202) of the gap retention plate 13 in accordance with an intended use, it is possible to perform the favorable communication between the nameplate 1 and the data reading device R10.

Although not shown as data, in case of forming the gap retention plate 13, instead of the sheet made of PET, of the styrofoam whose dielectric constant is close to air, or of the magnetic sheet having magnetic permeability and magnetic loss, the same test is performed. However, even when formed of which material, by increasing and decreasing the thickness of the gap retention plate 13, a tendency to increase and decrease the communication range between the non-contact IC label 10 and the reading device, is not almost seen, and a readable communication range is also quite a low value. Accordingly, it is found out that the material forming the gap retention plate 13, is necessary to be the dielectric body having the dielectric constant of a certain degrees. As a material forming the gap retention plate 13, in addition to PET, it is possible to suitably use polyester resin, phenol resin, or melamine resin or the like.

Furthermore, the upper limit of the thickness of the gap retention plate 13 is set to be 3000 μm in the present test, but if the nameplate 1 laying emphasis on the communication range is necessary, it is considered that the communication range is further enlarged by making the thickness of the gap retention plate 13 3000 μm or more.

When the fixed attenuator R3 is not used in the data reading device R10, since the output of the reader-writer R1 is increased up to 1 W (30 dBm) of the maximum, it is needless to say that the communication range is further lengthened. Furthermore, by making the thickness of the magnetic sheet 11, and electrical physical properties (such as magnetic permeability, magnetic loss, dielectric constant, or dielectric loss) to be suitable, and by optimizing the impedance matching of the impedance matching circuit section 17, and the shapes of the antenna elements 18 and 19, it is considered that the communication range can be further lengthened.

In the present test, the gap retention plate 13 is formed of the sheet made of PET, but the material forming the gap retention plate 13, is not limited if it is the dielectric body. For example, glass, rubber, or the liquid, is exemplified. According to the dielectric constant of the dielectric body in other materials, or the value of the dielectric loss, the case where a relationship between the thickness of the gap retention plate 13 and the communication range is different from the relationship which is shown in FIG. 7, is also considered. Accordingly, by appropriately performing selection of the material forming the gap retention plate 13, and setting of the thickness of the gap retention plate 13, it is possible to manufacture the nameplate 1 of various specifications.

Although not shown in the drawings and a table, the contents and the result of an additional test relating to plural simultaneous readings, are shown hereinafter.

The non-contact IC label 10 is respectively stuck onto the edge section of the center section on one longer side 30c which is shown in FIG. 2, and onto the edge section of the center section on the other longer side 30d of the main body section 30, and thereby the test of whether to read the two non-contact IC labels 10 at the same time, is performed.

Since the data reading device R10 which is used in the test, has plural simultaneous reading (anti-collision) functions, the test is possible in the same data reading device.

As a result of the test, it is found out that any of the non-contact IC labels 10 also favorably read. From this, a plurality of the non-contact IC labels 10 enables to be arranged in the main body section 30, for example, when used by being attached to the adherent made of metal which requires a long term management for several decades, the non-contact IC label 10 for backup for obtaining reliability, can be also installed inside the nameplate 1 in advance.

Although being an appearance of the nameplate 1 in planar view, since the main body section 30 is formed of one sheet of flat metallic plate without a slit or the like, the appearance thereof is the same as the nameplate made of metal in the related art. Accordingly, it is considered that the problems on appearance do not occur, even in case of arranging the nameplate of the invention having an RFID function instead of the nameplate of the related art.

In the main body section 30 of the nameplate of the present embodiment, by arranging a mounting hole which penetrates through the thickness direction D, being inserted a bolt, a screw or the like which is made of nonmetal such as plastic into the mounting hole, and being attached to the adherent made of metal, the nameplate and the adherent can be detachable. In this case, the adhesion layer for nameplate 43 is not arranged.

In the accommodation section 46, if electrical interference of the non-contact IC label 10 is not generated, in addition to the non-contact IC label 10, functional components (elements) such as a battery, an electronic circuit, or a sensor element, can be loaded. By making the sensor element as a temperature sensor, and the battery as a drive power supply, the present nameplate can be also used as a labelled nameplate having a semi-passive function such as carrying out a temperature measurement in independence operation. Furthermore, by including detachable structures of the mounting hole and the screw described before, and not including the adhesion layer for retention plate 42, replacement of the battery which is loaded in the accommodation section 46 is also possible.

For the object of preserving the functions of the non-contact IC label 10 which is housed in the accommodation section 46, for a long term, the inside of the sealed accommodation section 46 may be filled with the gas, the liquid, foaming material or the like, in accordance with use circumstances. It is effective when used in the circumstances in which stress such as temperature, vibration, or a shock is normally received.

The nameplate 1 according to the embodiment of the invention, is electrically one conductor, since the main body section 30 which is the main configuration thereof, is formed of metal. Therefore, when an electrical shock such as surge is received from the outside, since a surge current thereof, only leaks to the adherent made of metal, through the inside of the main body section 30 in the same manner as an ordinary electric wire, it is considered that there is almost no damage to the non-contact IC label 10 which is built in the nameplate 1.

The non-contact IC label 10 is stuck onto an inner wall of the accommodation section 46 by the adhesion layer for sheet 41 of insulation properties, and furthermore, the antenna elements 18 and 19, and the IC chip 16 are arranged on the magnetic sheet 11 where internal resistance is high. Accordingly, it can be said that the non-contact IC label 10 has a layer configuration which is strong in the electrical shock such as the surge even alone.

Since the non-contact IC label 10 is placed inside of the sealed accommodation section 46, so as to be required for the general RFID tag (inlet), it is not necessary to form a protective material, and to improve the appearance (visual value) at all. Accordingly, the non-contact IC label 10 can be in the form of being specialized in the communication function, cost, or the like.

In the present embodiment, the main body section 30 is formed into the rectangular shape in planar view, but as described before, if the main body section 30 resonates with the frequency of the communication electromagnetic wave of the data reading device R10, and the main body section 30 functions as a radiation antenna of the non-contact IC label 10, the shape is not limited. The main body section may be, for example, a circle, an oval, a triangle, or a polygon in planar view.

Moreover, the thickness of the main body section 30 is set to be 1 mm in the embodiment, but if the nameplate is not extremely thick, it is found out that superiority or inferiority of the communication performance due to a difference in the thickness of the main body section 30, is not almost made.

On the other hand, even when the thickness of the main body section 30 is thin, for example, if it has the thickness in which a high frequency current generated in the main body section 30 can flow without stress, the main body section 30 may be formed of a thin metallic body such as a metal deposition film.

The shapes of the antenna elements 18 and 19, are set to be the rectangular shapes in the embodiment described above, but if the main body section 30 functions as a radiation antenna, the shape is not limited. The shape of the antenna element may be set to be, for example, a square, the circle, the oval, or the polygon.

The shape of the magnetic sheet 11 in planar view, is favorable if overlapped with at least a portion of the communication section 12 configuring the impedance matching circuit section 17, and the antenna elements 18 and 19 in planar view, and it is checked that presence or absence of a blank portion (portion where the communication section 12 is not arranged in the magnetic sheet 11) does not largely affect the length of the communication range.

On the other hand, the thickness of the magnetic sheet 11, is set to be 350 μm in Example, but is favorable if it has the thickness which is necessary for functioning the main body section 30 as a radiation antenna. Although not shown as data, there is the tendency that the communication range is lowered when the thickness of the magnetic sheet 11 is 350 μm or less. Additionally, when the thickness of the magnetic sheet 11 is 350 μm or more, evaluation thereof is not performed.

From the test result described before, by placing the non-contact IC label 10 in the edge section of the center section on the longer side 30c of the main body section 30 in a planar view, it is found that the main body section 30 functions as a radiation element. Accordingly, even the main body section is the shape which is different from the present embodiment, and by placing the non-contact IC label 10 in the edge section of the center section on the longer side of the shape thereof, it is considered that the main body section functions as a radiation element. Furthermore, as the main body section is similar to the square or the like, when the length of each side of the main body section is equal to each other in planar view, the non-contact IC label 10 can be placed in the edge section of the center section on an arbitrary side.

Second Embodiment

Next, a second embodiment of the invention will be described, but only points which are different from the embodiment described before, will be described.

In the adherent made of metal as described above, as a boiler, a electric heater, an internal combustion engine, a steam turbine, a motor, or a light source, the adherent that is temporarily exposed to high-temperature circumstances such as the adherent which becomes at a high temperature, or passes through a drying furnace of the high temperature, is included. When the nameplate is attached to the adherent, the nameplate is necessary to also have heat resisting performance with respect to the high temperature, in addition to the communication performance.

In the nameplate of the present embodiment, in order to endure under the high temperature described before, a target upper limit temperature is set to be 200° C. Under the upper limit temperature, it is aimed that there are no modification, deterioration, peeling, and degradation of the communication performance of the non-contact IC label which is housed in the accommodation section 46, and no degradation such as modification, and deterioration of the gap retention plate. However, the communication performance under the upper limit temperature is not covered in the present embodiment, and the communication between the nameplate and the data reading device under the upper limit temperature, is not assumed.

Without changing a basic structure, by performing a boost of a heat resisting temperature of each component, the heat resisting properties of the nameplate is to be enhanced. The contents thereof will be described in detail hereinafter.

In the non-contact IC label 10 according to the first embodiment, the impedance matching circuit section 17, and the antenna elements 18 and 19, are formed by pattern printing with the silver paste ink on the principal face 20a of the base material 20. However, under the circumstances of 200° C. which is the upper limit of an operating temperature as described before, since the heat resisting temperature of the member configuring the impedance matching circuit section 17, and the antenna elements 18 and 19, is too low, the configuration of the non-contact IC label 10 according to the first embodiment is not useful. From this, the boost of the heat resisting temperature in the components of the impedance matching circuit section, and the antenna element which are shown in below, is examined.

In the first embodiment, the base material 20 is formed of the PET film, but by forming the base material of a film material such as polyimide, or polyetherimide whose heat resisting temperature exceeds 200° C., it is possible to boost the heat resisting temperature of the base material.

However, in this case, since the material of the base material varies, and thereby the value of the dielectric constant which is held in the material varies, it becomes necessary to carry out the optimization of the impedance matching circuit section.

In the first embodiment, the impedance matching circuit section 17, and the antenna elements 18 and 19, are formed by pattern printing with the silver paste ink. In the present embodiment, by forming these due to etching an aluminum thin film or a copper thin film, it is possible to boost the upper limit of the operating temperature in the impedance matching circuit section, and the antenna element up to 200° C.

In the first embodiment, the connection of a bump of the IC chip 16 and the impedance matching circuit section 17, uses a flip-chip mounting bonding method by ACP (anisotropic conductive paste) which is a bonding material, and due to an adhesion effect of the ACP material, the bump and the impedance matching circuit section 17 are electrically connected.

However, in the mounting method, under the circumstances of 200° C. which is the upper limit of the operating temperature, since the heat resisting temperature of the ACP is too low, the electrical connection of the IC chip 16 and the impedance matching circuit section 17 is not be guaranteed.

By using an ultrasonic welding method (metal welding method by ultrasonic bonding) completely without using the bonding material of a low heat resisting temperature such as the ACP, the bump of the IC chip 16 and the impedance matching circuit section can be welded by ultrasonic waves even between dissimilar metals.

Accordingly, by using the bonding method, it is possible to obtain the reliability of the electrical connection under the circumstances of 200° C. which is the upper limit of the operating temperature.

The magnetic sheet 11 of the first embodiment, is formed of the composite material of the magnetic particles, or the magnetic flakes, and the plastic or the rubber. The upper limit of the operating temperature of the magnetic sheet 11, is 85° C. (manufacturer recommendation value). Among the values of the peculiar physical properties which is held in the magnetic sheet 11, parameters which largely affect antenna properties (antenna sensitivity), are the values of the magnetic permeability and the magnetic loss, and on the other hand, if the values of the dielectric constant and the dielectric loss are compared therewith, it is found out that the degrees affecting the antenna properties are small.

The values of the magnetic permeability and the magnetic loss of the magnetic sheet 11, is determined by shaping, the direction, density, and the like of the used magnetic particles or the magnetic flakes. The values of the dielectric constant and the dielectric loss of one side, is determined by the dielectric constant, and the dielectric loss of a binder (binding agent), in addition to the shaping, the direction, and the density of the magnetic particles or the magnetic flakes.

Without changing the materials of the magnetic particles or the magnetic flakes of the magnetic sheet 11, by changing only the binder to the material including at least one of heat resisting binders whose heat resisting temperature exceeds 200° C., such as silicone resins, fluororesins, curable epoxy resins, polyethersulfone resins, or polyimide (polyamide) resins, it is possible to make the magnetic sheet to be a magnetic sheet with heat resisting properties. However, by changing the used binder, the values of the dielectric constant, and the dielectric loss of the magnetic sheet also vary.

However, since the influence of the two parameters is small with respect to the antenna properties as described above, by carrying out the optimization of the impedance matching circuit section, it is considered that the communication performance of the non-contact IC label accompanying with the change to the heat resisting binder is not almost lowered.

In the first embodiment, the gap retention plate 13 is formed of the sheet made of PET. In the present embodiment, the gap retention plate is formed into a sheet shape with the material whose heat resisting temperature exceeds 200° C., such as polyimide, or polyetherimide, and thereby it is possible to boost the heat resisting temperature of the gap retention plate.

However, since the material of the gap retention plate varies, and thereby the value of the dielectric constant which is held in the material varies, as described above, it is necessary to reset the thickness with respect to the communication range in accordance with the intended use.

The adhesion layers 41, 42, and 43, can suitably use the material of acrylic or silicone whose heat resisting temperature exceeds 200° C.

In this way, the magnetic sheet, the antenna element, the gap retention plate, the base material, the adhesion layers 41, 42, and 43, and the main body section formed of metal using the material and a forming method which are different from the first embodiment, have the heat resisting properties of 200° C.

A communication test with the reading device is not performed, but it is considered that the nameplate in which a heat countermeasure is processed as described above, obtains almost the same result of the communication range as the nameplate 1 of the first embodiment described before.

As described above, by using the non-contact IC label and the nameplate of the present embodiments, it is communicatable even if directly attached to the adherent made of metal, and it is possible to configure in the thin type.

Moreover, in the non-contact IC label and the nameplate of the present embodiments, since the magnetic sheet, the antenna element, the gap retention plate, and the base material have the heat resisting properties, it is possible to configure the non-contact IC label that can endure even in the circumstances of 200° C. which is the upper limit of the operating temperature.

Furthermore, in the non-contact IC label and the nameplate of the present embodiments, since the main body section and the adhesion layers 41, 42, and 43 have the heat resisting properties, it is possible to configure the nameplate that can endure even in the circumstances of 200° C. which is the upper limit of the operating temperature.

Moreover, as described above in the present embodiments, the communication performance under the upper limit temperature is not covered, but by increasing the upper limit of the operating temperature of the IC chip 16 which is used in the non-contact IC label of the present embodiment, it is possible to guarantee the communication performance under the upper limit temperature of the non-contact IC label.

In the present embodiments, a target value of the upper limit of the operating temperature is 200° C., but since the member of the lowest heat resisting temperature becomes an obstacle among the components which are used in the nameplate, if it is possible to increase the heat resisting temperature of the obstacle member, it is possible to boost an upper limit value of the operating temperature as a whole nameplate.

Third Embodiment

Next, a third embodiment of the invention will be described with reference to FIG. 8, but description thereof is omitted by affixing the same reference signs to the same portions as the embodiments described above, and only the different points will be described.

Figure 8:
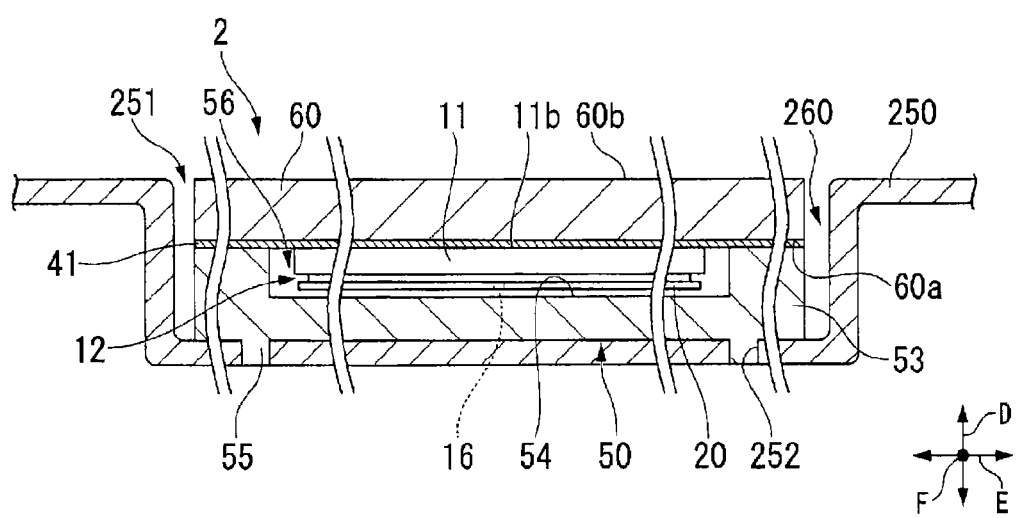
FIG. 8 is a cross-sectional view of a main section of a nameplate according to a third embodiment of the invention.

As shown in FIG. 8, a nameplate 2 of the present embodiment includes a non-contact IC label 50, and the main body section 60, instead of the non-contact IC label 10 and the main body section 30 in the nameplate 1 of the first embodiment.

Instead of the gap retention plate 13 of the non-contact IC label 10, the non-contact IC label 50 includes a gap retention member (gap retention section) 53. In the example, the gap retention member 53 is formed by injection molding using the dielectric body such as resin (plastic).

The gap retention member 53 is formed into a rectangular plate shape in planar view, and on one face, a concave section 54 is formed, and a plurality of protrusion sections 55 are formed on the other face. The concave section 54, is formed into the size which enables to accommodate the magnetic sheet 11, the communication section 12, and the base material 20.

The main body section 60 is formed into the same rectangular plate shape as the gap retention member 53 in planar view. The main body section 60 is formed of the same material as the main body section 30 of the embodiments described above.

On a first face 60a of the main body section 60, the adhesion layer for sheet 41 is arranged. The other face 11b of the magnetic sheet 11, and one face of the gap retention member 53, are stuck onto the adhesion layer for sheet 41, in the state of being accommodated the magnetic sheet 11, the communication section 12, and the base material 20 within the concave section 54.

When the gap retention member 53 is attached to the main body section 60, from the main body section 60, and the concave section 54 of the gap retention member 53, an accommodation section 56 is formed.

In an adherent 250 made of metal, an accommodation section 251 which is recessed from the outer face, is formed. On the bottom face of the accommodation section 251, a plurality of fitting holes 252 are formed. An inner diameter of the fitting hole 252, is equal to an outer diameter of the protrusion section 55 of the gap retention member 53, or is set to slightly larger degrees.

By press fitting the protrusion section 55 to the fitting hole 252, the nameplate 2 is attached to the accommodation section 251 of the adherent 250 without going through the adhesion layer.

When the nameplate 2 is attached to the accommodation section 251 of the adherent 250, the outer face of the adherent 250, and the second face 60b of the main body section 60, are set to be on almost the same face. Hereby, it is prevented that the nameplate 2 protrudes from the adherent 250.

If it is possible to make the depth in which the accommodation section 251 is recessed to be larger, since the gap retention member 53 can be thickened to that extent, it is possible to further lengthen the communication range of the nameplate 2 as described above.

Since the accommodation section 56 is formed by sealing the concave section 54 with the main body section 60, the accommodation section 56 has the sealing function in the present embodiment, in the same manner as the embodiments described above.

A crack 260 that is formed between the inner face of the accommodation section 251 and an outer circumference face of the nameplate 2, can be filled with a known sealing material which is not shown in the drawings. Color of the main body section 60 and the sealing material is made to be the same color as the adherent 250, or the approximate color, and thereby it is possible to visually conceal the presence of the nameplate 2 including the crack 260. Accordingly, it is possible to enhance the value of the adherent 250.

As described above, according to the non-contact IC label 50 and the nameplate 2 of the present embodiment, it is communicable even when attached to the adherent 250, and it is possible to configure in the thin type.

The gap retention member 53 is formed by injection molding, but if the dielectric body is present between the main body section 60 and the adherent 250, and the gap between the main body section 60 and the adherent 250 is kept, the form and a manufacturing method of the gap retention plate are not limited. For example, by filling the sealing material which is the dielectric body, or an adhesion material in the accommodation section 251, the gap retention plate may be formed. In this case, if adherence of the first face 60a of the main body section 60 and the magnetic sheet 11 is kept, the adhesion layer for sheet 41 may not be arranged in the nameplate 2.

In the present embodiment, the outer face of the adherent 250 is used as a conductor ground plate, but the structure of including the metallic plate corresponding to the conductor ground plate in the nameplate 2 itself, and making the metallic plate to be a portion of the adherent 250, may be used.

Hitherto, the third embodiment from the first embodiment of the invention, are described in detail with reference to the drawings, but the specific configurations are not limited to the embodiments, and the modification of the configuration of the domain without departing from the gist of the invention, and the like are also included. Furthermore, it is needless to say that each of the configurations shown in each embodiment can be used by appropriately combining therewith.

For example, in the third embodiment from the first embodiment, when it is easy to handle the impedance matching circuit section and the antenna element by being formed relatively thick, without including the base material in the non-contact IC label, the impedance matching circuit section and the antenna element may be directly formed on one face of the magnetic sheet.

Moreover, in the embodiments described above, the whole main body section is made to be the metal member. However, for example, a portion of the main body section is the metal member, and a remaining section of the main body section may be a resin member which is formed of the resin. In this case, the non-contact IC label is stuck to the metallic member among the main body section.

The intended use of the invention is intended to be the nameplate, but the intended use of the invention is not limited thereto, and a generic radio communication device, an RFID tag, or the like may be used. For example, it may be a wireless data collection device, an RFID tag corresponding metal, an active RFID tag, or the like.

Among the RFID tags of various configurations, for example, in the RFID tag of an electromagnetic induction system using a radio wave of 13.56 MHz band, by arranging a magnetic body (magnetic sheet) of high permeability between an antenna and the RFID tag, a route of magnetic flux with a small loss is secured between the antenna and the adherent. As such, it is realized to manufacture the RFID tag that can be used to be attached to the adherent made of metal. The communication performance is lowered, but when a thickness of the magnetic body can be thinned as, for example, 100 μm or 100 μm or less, it is possible to manufacture the thin RFID tag corresponding to metal which corresponds to the adherent made of metal.

In contrast, in the RFID tag of a radio wave system that is used in a UHF band and a SHF band, by arranging a dielectric body or an air layer between the antenna and the adherent, a gap between the antenna and the adherent is secured. Thereby, a method for suppressing influence of the adherent made of metal on the antenna is generally used.

However, in the method, between the antenna and the adherent, when the dielectric body of 100 μm in thickness is used, or the air layer of 100 μm in thickness is arranged, the influence of the adherent is strongly received, and it is unable to communicate. Accordingly, in the present state, it is difficult to manufacture the thin RFID tag (the thickness is several hundreds μm or less) as used in 13.56 MHz band.

As the other RFID tag of the radio wave system that is used in the UHF band and the SHF band, for example, as shown in PTL 1, the configuration of arranging the magnetic body between the antenna and the adherent is also proposed. In the RFID tag, a soft magnetic body is placed between the antenna and the adherent. In PTL 1, the soft magnetic body is disclosed in minute detail. On the other hand, the antenna to be used is stayed in a disclosure of degrees named a dipole antenna and a modification antenna of a big pole antenna, and a detail of an antenna shape is not disclosed in an actual inspection, and only an example of 1 mm in thickness of the magnetic body (a communication range is 15 mm), is disclosed. Furthermore, a specific general example, a shape, a size, and the like of the adherent which is an attachment target of the RFID tag, are also not disclosed.

Moreover, such RFID tag is used by being stuck to or being built in a nameplate made of metal where a product name and the like are shown in a surface. The nameplate is also used by being attached or the like to the adherent made of metal, in the same manner as the RFID tag described before.

Patent Literature PTL 1: JP-A-2005-309811

However, if the RFID tag which is disclosed in PTL 1 described above, for example, is too thick to be used as a label, there is a problem that it is very difficult to use when used with being stuck to the nameplate where thinness is required.

The invention is made in view of such problems, and an object thereof is to provide an RFID tag which is able to communicate even if directly attached to an adherent made of metal, and can be made thin and significantly superior in practicality, and a nameplate including the RFID tag.

In order to solve the problems described above, the invention proposes the following means.

According to a first aspect of the invention, there is provided a non-contact IC label including a magnetic sheet, an IC chip that is arranged on a first magnetic face of the magnetic sheet, a first antenna section and a second antenna section that are arranged on the first magnetic face and are connected to the IC chip, and a gap retention section that is formed from a dielectric body, in which the IC chip, the first antenna section, and the second antenna section are placed between the magnetic sheet and the gap retention section.

Furthermore, it is more preferable that the magnetic sheet, the first antenna section, the second antenna section, and the gap retention section have heat resisting properties.

Moreover, the non-contact IC label according to the first aspect of the invention, includes a base material that is formed into a film shape and has the heat resisting properties, and it is more preferable that the IC chip, the first antenna section, and the second antenna section are placed on the first magnetic face of the magnetic sheet, in a state of being arranged on a principal face of the base material.

Additionally, it is more preferable that the IC chip and the first antenna section, and the IC chip and the second antenna section, are metal-welded by ultrasonic bonding.

Furthermore, it is more preferable that the magnetic sheet is formed of magnetic particles or magnetic flakes, and a binder, and at least one of silicone resins, fluororesins, curable epoxy resins, polyethersulfone resins, and polyimide resins, is used in the binder.

Moreover, in the non-contact IC label according to the first aspect of the invention, it is more preferable to communicate with a data reading device using a radio wave system.

In addition, it is more preferable that a thickness of the magnetic sheet in the gap retention section is greater than 0.5 mm, and is 3 mm or less.

Furthermore, according to a second aspect of the invention, there is provided a nameplate including the non-contact IC label according to the first aspect of the invention, and a plate-shaped main body section that has a metallic member, in which the non-contact IC label is attached to the metallic member, by sticking a second magnetic face which is an opposite face to the first magnetic face of the magnetic sheet onto the metallic member through an adhesion layer.

Moreover, it is more preferable that the main body section is formed into a rectangular shape in planar view, and the non-contact IC label is arranged in an edge section of a center section on a longer side of the main body section in planar view.

Additionally, it is more preferable that on a first face of the main body section, a hole section accommodating a portion of the non-contact IC label is formed, and the gap retention section is attached to the first face of the main body section so as to cover the hole section.

Furthermore, it is more preferable that the main body section and the adhesion layer have the heat resisting properties.

The RFID tag and the nameplate according to the aspects of the invention described above, are able to communicate even if directly attached to the adherent made of metal, and can be made thin and significantly superior in practicality.

DESCRIPTION OF REFERENCE NUMERALS 1, 2 nameplate
10, 50 non-contact IC label
11 magnetic sheet
11a one face (first magnetic face)
11b the other face (second magnetic face)
13 gap retention plate (gap retention section)
18 first antenna element (first antenna section)
19 second antenna element (second antenna section)
20 base material
20a principal face
30, 60 main body section
30c longer side
31 hole section
41 adhesion layer for sheet (adhesion layer)
53 gap retention member (gap retention section)
D thickness direction (second thickness direction)

Obviously, numerous modifications and variations of the present invention are possible in light of the above teachings. It is therefore to be understood that within the scope of the appended claims, the invention may be practiced otherwise than as specifically described herein.

The invention claimed is:

1. A non-contact IC label, comprising:
   a magnetic sheet;
   a gap retention member comprising a dielectric material; and
   a communication section provided between the magnetic sheet and the gap retention member, the communication section including an IC chip and a first antenna section and a second antenna section which are connected to the IC chip,
   wherein the magnetic sheet has a first magnetic face facing the gap retention member, and the IC chip, the first antenna section and the second antenna section are provided on the first magnetic face of the magnetic sheet.

2. The non-contact IC label according to claim 1, wherein the magnetic sheet, the gap retention member, the first antenna section and the second antenna section are heat resistant.

3. The non-contact IC label according to claim 1, further comprising:
   a base film positioned between the communication section and the gap retention member,
   wherein the base film is heat resistant and has a principal face facing the IC chip, the first antenna section, and the second antenna section.

4. The non-contact IC label according to claim 1, wherein the IC chip is metal-welded by ultrasonic bonding with each of the first antenna section and the second antenna section.

5. The non-contact IC label according to claim 1, wherein the magnetic sheet comprises a binder and magnetic particles or magnetic flakes, and the binder comprises at least one of a silicone resin, a fluororesin, an epoxy resin, a polyethersulfone resin, and a polyimide resin.

6. The non-contact IC label according to claim 1, which is configured to communicate with a data reading device through a radio wave.

7. The non-contact IC label according to claim 1, wherein the gap retention member has a thickness of greater than 0.5 mm, and 3 mm or less.

8. A nameplate, comprising:
the contact IC label according to claim 1; and
a main body comprising a metallic material,
wherein the magnetic sheet in the non-contact IC label has a second magnetic face opposite to the first magnetic face, and an adhesion layer is formed such that the second magnetic face is adhered to the main body through the adhesion layer.

9. The nameplate according to claim 8, wherein the main body has a rectangular shape, and the non-contact IC label is placed adjacent to a longitudinal side of the main body and positioned in a central portion of the longitudinal side of the main body.

10. The nameplate according to claim 8, wherein the main body has a first face on which a hole accommodating a portion of the non-contact IC label is formed, and the gap retention member is formed on the first face of the main body such that the hole is covered.

11. The nameplate according to claim 8, wherein the main body and the adhesion layer are heat resistant.

12. The nameplate according to claim 8, wherein the non-contact IC label further comprises a base film positioned between the communication section and the gap retention member.

13. The nameplate according to claim 12, wherein the base film is resistant to a temperature exceeding 200° C.

14. The nameplate according to claim 8, wherein the gap retention member of the non-contact IC label has a thickness of greater than 0.5 mm, and 3 mm or less.

15. The nameplate according to claim 8, wherein the gap retention member of the non-contact IC label has a thickness of from 1500 μm to 2750 μm.

16. The nameplate according to claim 8, wherein the gap retention member has a concave portion in which the magnetic sheet and the communication section are accommodated.

17. The nameplate according to claim 16, wherein the non-contact IC label further comprises a base film which is formed on the communication section and accommodated in the concave portion of the gap retention member.

18. The nameplate according to claim 17, wherein the magnetic sheet, the gap retention member, the first antenna section, the second antenna section and the base film are resistant to a temperature exceeding 200° C.

* * * * *